(12) United States Patent
Bush et al.

(10) Patent No.: US 8,949,970 B2
(45) Date of Patent: Feb. 3, 2015

(54) AUTOMATION SYSTEM ACCESS CONTROL SYSTEM AND METHOD

(71) Applicant: Rockwell Automation Technologies, Inc., Mayfield Heights, OH (US)

(72) Inventors: Michael A. Bush, Hudson, OH (US); Robert Brandt, Menomonee Falls, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 157 days.

(21) Appl. No.: 13/665,817

(22) Filed: Oct. 31, 2012

(65) Prior Publication Data

US 2014/0123276 A1    May 1, 2014

(51) Int. Cl.
*G06F 7/00* (2006.01)
*G06F 9/00* (2006.01)

(52) U.S. Cl.
USPC .............................................. 726/17; 726/21

(58) Field of Classification Search
None
See application file for complete search history.

(56) References Cited

U.S. PATENT DOCUMENTS

| | | | | |
|---|---|---|---|---|
| 5,291,598 | A * | 3/1994 | Grundy | 726/28 |
| 5,684,337 | A * | 11/1997 | Wallace | 307/10.2 |
| 6,665,648 | B2 * | 12/2003 | Brodersen et al. | 705/7.11 |
| 7,797,727 | B1 * | 9/2010 | Miller et al. | 726/1 |
| 8,594,895 | B2 * | 11/2013 | McKee | 701/50 |
| 2002/0183875 | A1 * | 12/2002 | Arima et al. | 700/95 |
| 2002/0183876 | A1 * | 12/2002 | Arima et al. | 700/95 |
| 2002/0183880 | A1 * | 12/2002 | Arima et al. | 700/110 |
| 2004/0088066 | A1 * | 5/2004 | Yamazaki et al. | 700/95 |
| 2005/0033465 | A1 * | 2/2005 | Arima et al. | 700/108 |
| 2006/0294047 | A1 * | 12/2006 | Johnston et al. | 707/1 |
| 2008/0204191 | A1 * | 8/2008 | Alrabady | 340/5.21 |
| 2009/0086977 | A1 * | 4/2009 | Berggren | 380/279 |
| 2009/0165127 | A1 * | 6/2009 | Jung et al. | 726/21 |
| 2009/0292389 | A1 * | 11/2009 | Jung et al. | 700/117 |
| 2011/0039237 | A1 * | 2/2011 | Skare | 434/118 |
| 2011/0178619 | A1 * | 7/2011 | Jung et al. | 700/95 |
| 2013/0145482 | A1 * | 6/2013 | Ricci et al. | 726/28 |
| 2013/0205412 | A1 * | 8/2013 | Ricci | 726/29 |
| 2013/0227648 | A1 * | 8/2013 | Ricci | 726/3 |
| 2014/0143839 | A1 * | 5/2014 | Ricci | 726/4 |

* cited by examiner

*Primary Examiner* — Christopher Revak

(74) *Attorney, Agent, or Firm* — Fletcher Yoder, P.C.

(57) ABSTRACT

An improved system and method for controlling access of components to industrial automation system resources by reference to the various operational states of the industrial automation system. A central access control system includes a processing circuitry, interface circuitry configured to receive information pertaining to the operational state of an automation system, memory circuitry, and a display and user interface. In operation, access to automation components are either allowed or denied based on the designation of an operational state of an automation system.

20 Claims, 6 Drawing Sheets

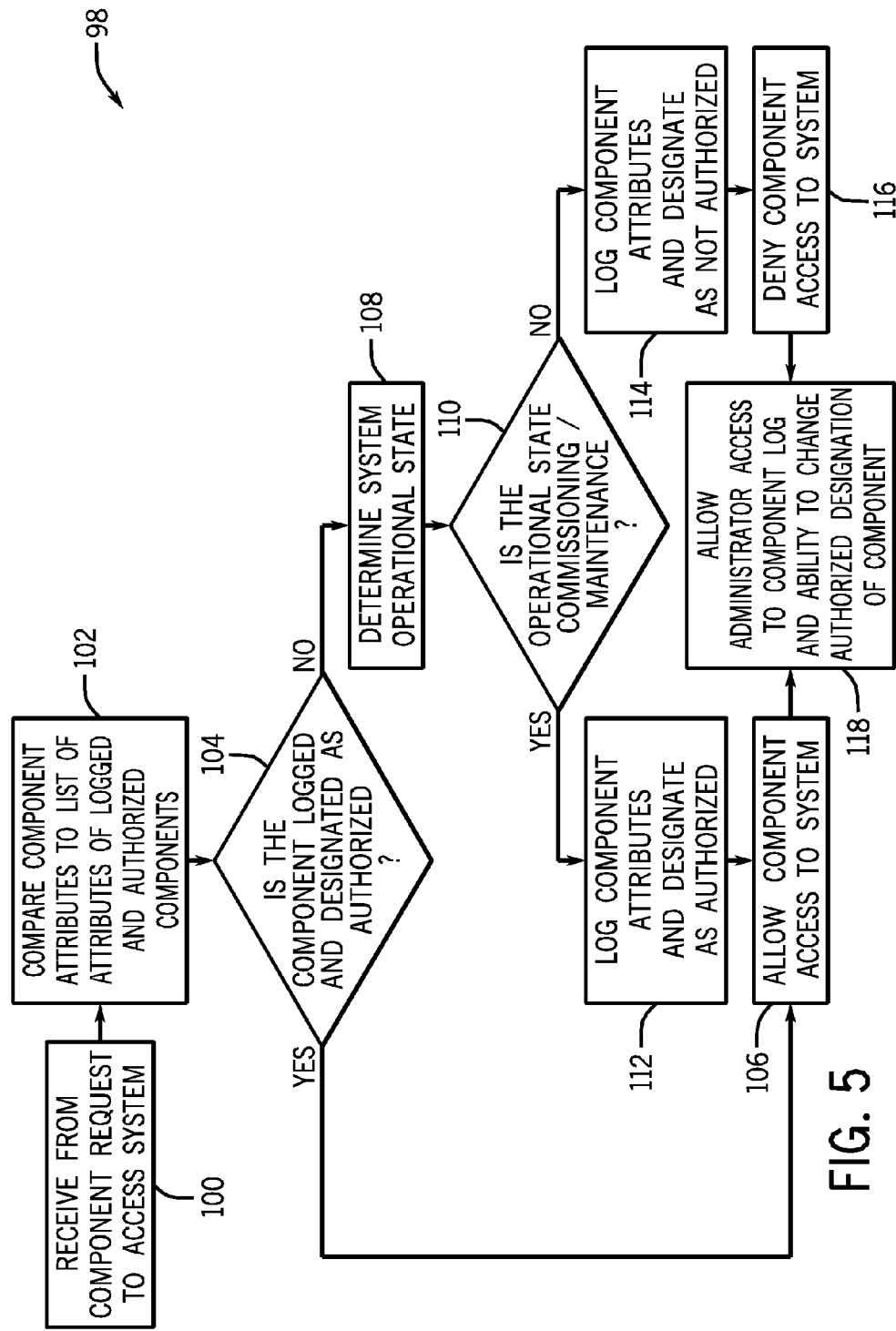

| AUTOMATION SERVICE DIAGNOSTICS VIEWER | | | | |
|---|---|---|---|---|
| PROCESS | VERSION | COMPUTER | PUBLISHER INFO | ACCESS ALLOWED |
| FTDATAUPDATE.EXE | 2.51.0.8 | COMPUTER 1 | PUBLISHER 1 | ☐ |
| FTDATAUPDATE.EXE | 2.50.0.10 | COMPUTER 2 | NONE | ☑ |
| FTCONFIGURATIONUTILITY.EXE | 2.51.0.8 | COMPUTER 1 | PUBLISHER 1 | ☐ |
| FTCONFIGURATIONUTILITY.EXE | 2.51.0.3 | COMPUTER 2 | NONE | ☑ |
| FTPASSWORDRESETCLIENT.EXE | 1.0.0.1 | COMPUTER 1 | NONE | ☑ |
| FTSETDIRSVR.EXE | 2.51.0.8 | COMPUTER 1 | PUBLISHER 1 | ☑ |
| FTSETDIRSVR.EXE | 2.50.0.10 | COMPUTER 2 | NONE | ☐ |
| FTSPVSTUDIO.EXE | 2.51.0.8 | COMPUTER 1 | PUBLISHER 1 | ☑ |
| FTSPVSTUDIO.EXE | 2.50.0.10 | COMPUTER 2 | NONE | ☑ |
| NMSPHOST.EXE | 2.51.0.8 | COMPUTER 1 | PUBLISHER 1 | ☑ |
| NMSPHOST.EXE | 2.50.0.2 | COMPUTER 2 | NONE | ☐ |
| RDCVHOST.EXE | 2.51.0.8 | COMPUTER 1 | PUBLISHER 1 | ☑ |

SETTINGS

☑ ENABLE DEFAULT ACCESS — NOTE: WHEN SELECTED, ANY NEW FTSP PROCESS WILL BE AUTOMATICALLY ALLOWED ACCESS. IF UNSELECTED, ANY NEW FTSP PROCESS WILL BE AUTOMATICALLY DENIED ACCESS. YOU CAN TOGGLE THE ACCESS PERMISSIONS OF A PROCESS ABOVE.

☑ VERIFY PUBLISHER INFO — NOTE: WHEN SELECTED, ALL FTSP PROCESSES WILL HAVE ITS PUBLISHER INFORMATION VERIFIED. IF THE VERIFICATION FAILS, THE PROCESS WILL AUTOMATICALLY BE DENIED ACCESS.

FIG. 6

| | TIME | LOCATION | PROVIDER | USER | FULL NAME |
|---|---|---|---|---|---|
| ◇ | 07/18/2012 10:41:25 AM | LOCATION 1 | AUTOMATION SERVICE | USER A | |
| | IN SERVICE. THE AUTOMATION NETWORK DIRECTORY SERVER ON COMPUTER LOCATION 1 IS NOW ACTIVE. | | | | |
| ◊ | 07/18/2012 10:41:36 AM | LOCATION 1 | AUTOMATION SECURITY | USER A | NAME |
| | SUCCESSFUL LOGIN OF USER [USER 1] ON DIRECTORY [NETWORK] | | | | |
| ⊗ | 07/18/2012 10:41:51 AM | LOCATION 1 | AUTOMATION SECURITY | USER A | NAME |
| | LOGIN FAILURE FOR APPLICATION [SERVERTEST.EXE] ON DIRECTORY [NETWORK]. THE APPLICATION WAS DENIED ACCESS. | | | | |
| ◇ | 07/18/2012 10:52:26 AM | LOCATION 1 | AUTOMATION ADMINISTRATION CONSOLE | USER A | NAME |
| | LOGOUT OF USER [USER 1] | | | | |
| ◊ | 07/18/2012 10:52:37 AM | LOCATION 1 | AUTOMATION SECURITY | USER B | NAME |
| | LOGIN FAILURE OF [USER B] ON DIRECTORY [NETWORK]. USER AUTHENTICATION FAILED. | | | | |
| ◊ | 07/18/2012 01:02:29 PM | LOCATION 1 | AUTOMATION SECURITY | USER A | NAME |

MESSAGE: LOGIN FAILURE FOR APPLICATION [SERVERTEST.EXE] ON DIRECTORY [NETWORK]. THE APPLICATION WAS DENIED ACCESS.
SEVERITY: ERROR           PROVIDER: AUTOMATION SECURITY
AUDIENCE: ENGINEER        USER: USER B
TIME: 07/18/2012 10:41:51 AM    FULL NAME:
LOCATION: LOCATION 1
- ADDITIONAL FIELDS -           RESOURCE: NETWORK
VERBOSITY: 0

FIG. 7

AUTOMATION SYSTEM ACCESS CONTROL SYSTEM AND METHOD

BACKGROUND

The invention relates generally to the field of automation control systems. More particularly, embodiments of the present disclosure relate to a system and method for controlling access of components to automation system resources by exploiting the unique characteristics of industrial automation systems.

Industrial automation system components have traditionally been interconnected by specialized networks using standard industrial protocols for access and data exchange. While there has been increasing interest in remote access to systems, components, and data, the unique environment of industrial production and material handling has made adoption of conventional technologies used in other areas difficult and challenging. One particular challenge with traditional industrial automation systems involves how best to manage the permission allowed to the individual systems, components, and individuals attempting access to an automation system or resource. Industrial automation environments often include numerous components that must have the ability to locate each other and to communicate with one another in normal operation. A properly implemented access control system for use in an industrial automation system should allow all essential interaction but disallow any unknown or unwanted interactions. The numbers of possible interactions can increase exponentially with each additional component in a system, thereby also increasing the complexity of administration of an access control system. As a result, these access control systems are often under-utilized and at times completely neglected, leaving industrial automation systems either open to substantially uncontrolled access, or tightly locked down in a manner that may limit the effectiveness of the system, or tax administrative personnel who must review and permit access when needed.

There is therefore a need for improved techniques for controlling access to automation system resources.

BRIEF DESCRIPTION

The present invention provides an improved system and method for controlling access of components to industrial automation system resources by reference to the various operational states of the industrial automation systems. In accordance with aspects of the invention a central access control system includes a processing circuitry, interface circuitry, memory circuitry and a display and user interface. The system further comprises a set of records of information gathered pertaining to elements that have attempted or may attempt access to the automation system in the future. Through this system access to automation components are either allowed or denied based on the designation of an operational state of an automation system in addition to a set of predetermined criteria. In certain embodiments, the additional criteria can be more or less restrictive depending on the operational state of the industrial automation system.

DRAWINGS

These and other features, aspects, and advantages of the present invention will become better understood when the following detailed description is read with reference to the accompanying drawings in which like characters represent like parts throughout the drawings, wherein:

FIG. 5 is a flow chart illustrating another embodiment of exemplary logic for controlling access to an industrial automation system during a second operational state;

FIG. 6 is an exemplary user interface screen of the access control system depicting a diagnostic viewer; and FIG. 7 is an exemplary user interface screen of the access control system of FIG. 1 depicting a view of records for accessing components.

DETAILED DESCRIPTION

Figure 1:
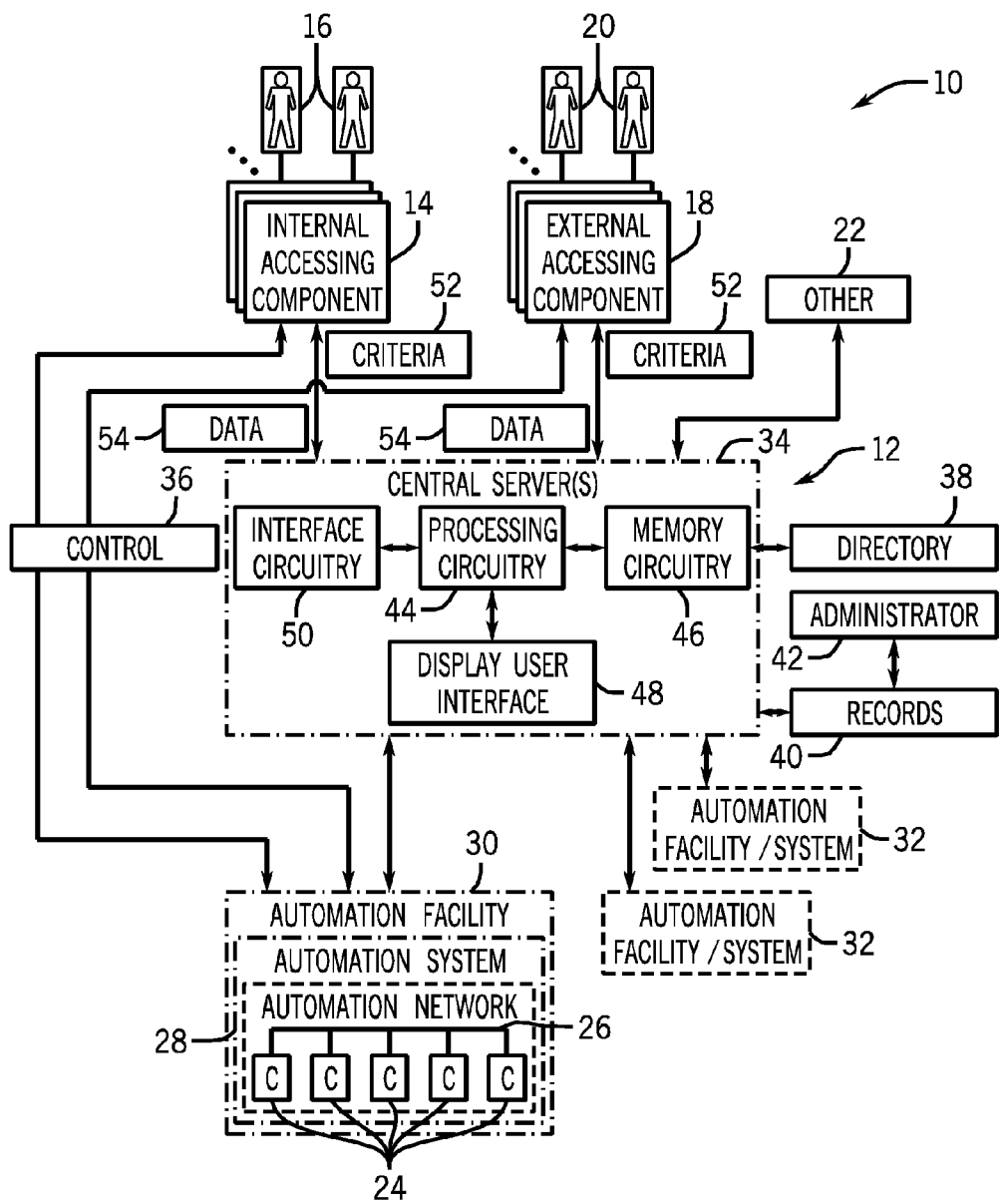
FIG. 1 is a diagrammatical representation of an exemplary access control system for overseeing and controlling access to an industrial automation system.

FIG. 1 is a diagrammatical view of an exemplary embodiment of an access control system 10 adapted to control access to an industrial automation system 12. The access control system 10 of the present embodiment is in connection with the industrial automation system 12 and is configured to permit or deny access to the resources of the automation system based on characteristics of the then-present operational state of the automation system 12. The access control system may reside on a single system (e.g., a computer, a server, etc.) as illustrated in the presently considered embodiment, or may reside on multiple systems (e.g., a network of computers and/or servers). The access control system may be configured to control access to a limited subset of an automation system such as for a single process, or a designated group of processes, an entire automation system of an automated facility site, or multiple automation systems at multiple facilities on multiple sites working to carry out control on a more global level, such as an enterprise level. The access control system may be hosted locally or reside at a remote location such as at an enterprise headquarters or a secured data center. The industrial automation system may include one or more internal accessing components 14, and external accessing components 16. Internal accessing components may include processes, applications, devices, or any other elements that may be within an industrial automation system or facility. These internal accessing components may interface with human actors 16, such as in processes that are manually run or overseen, such as in response to input from the actor via a computer workstation, a personal computer, a portable or handheld device, a dedicated human machine interface, or the like. Some accessing components may have no human actor interaction, such as devices controlled by programmable automation devices, motor controllers, scheduled routines of automation software, input/output devices, supervisory systems, and so forth. Additionally, there may be external accessing components 18 separate from the automation control system. They also include any processes, applications, devices, or other elements that may interact with an industrial automation system. These components similarly may or may not interface with human actors 20. Other components 22 that may attempt to gain access to the industrial automation system are also contemplated within the presently considered embodiment. Such components may fit within other classes, such as systems that may access the system from time to time for system evaluation, troubleshooting, maintenance, and so forth.

Automation components 24 are the resources belonging to the industrial automation system to which the accessing components 14, 18, 22 may seek access. It will be appreciated that the automation components 24 may also act as internal accessing components 14 and internal accessing components 14 may also act as automation components 24 of the industrial automation system, access to which is controlled by the access control system 10. The automation components 24 are connected by a communication network 26. This network encompasses the actual connection of the accessing components, but may also include a range of hardware, software, and firmware that use the connection to send data to and receive data from external elements such as other networks, computers, controllers, actuators and so on. This network may be a physical (wired or wireless) network or may be a virtual network and may follow one or more of a number of communications protocols such as CIP, ControlNet, DeviceNet, Ethernet or any network protocol that is currently used in industrial automation, has been used in the past, or may be developed and used in the future.

The networked components are parts of the automation system 28 located within an automation facility 30. A single access control system may control access for one or more automation systems 28 or automation facilities 32. The access control system may reside on one or more central servers 34. The central server may exclusively host the access control system such as on a dedicated server or a server may share resources with other systems and processes. In a presently contemplated embodiment, the central server directs one or more control components 36 that are external to the central server 34, but such control components may also be integrated within the central server. A directory 38 of the automation system components can be directly connected to the access control system. This directory may contain identifying information for a subset or all of the automation system components. It may also include data identifying accessing components, human actors involved in the automation system, and so forth. The identifying information may include location information such as physical location, location on an internal network, or an external (e.g., Internet) location identifier, as well as other identifying information such as the type or role of the component (e.g., a sensor, actuator, process, software, hardware, firmware, or other element).

In the present embodiment, each instance of attempted access by an accessing component 14, 16 is stored in a database of records 40, along with information unique to the attempted access and an indicator of whether the access is permitted or denied. These records 40 or a specific subset of the records is accessed by an administrator 42 where they may be monitored or altered. For example, the administrator may change the authorization indicator of the record, either to change access from allowed to denied, or from denied to allowed.

Processing circuitry 44 is found within the central server of the present embodiment in which the determination of authorization is made. It should be noted that in some embodiments an administrator may add a record without a prior attempt at access in order to proactively allow access to an accessing component that has not made a prior successful or failed attempt at access, or to a group of components that have not made prior attempts at access. Memory circuitry 46 is associated with the processing circuitry and allows for storage of the access control software as well as parameters of the software (and any other code for processes carried out by the processing circuitry). In a presently contemplated embodiment, the memory 46 of the central server may be separate from the memory storing the access record information, but may be integrated in certain embodiments. A display/user interface 48 may show graphical representations of the processes of the access control system through which an administrator may interact. These interactions may include monitoring access attempt activity and the making manual changes to access records. Interface circuitry 50 may be present on the central server 34 to receive data from and send data to the accessing components 14, 18, 22, the control component 36, and/or the one or more automation facilities 30, 32.

Criteria 52 are attributes of the accessing entities (e.g., components and/or human actors) that may be the bases for permitting or denying access to the automation system components 24. In exemplary embodiments the criteria includes process name, software application, application version, publisher, and accessing component identifying data. Criteria can also include user identifying data (e.g., for human actors). Target data 54 include the information that the accessing component 14, 18, 22 wishes to send to or receive from the automation component 24 of interest.

Figure 2:
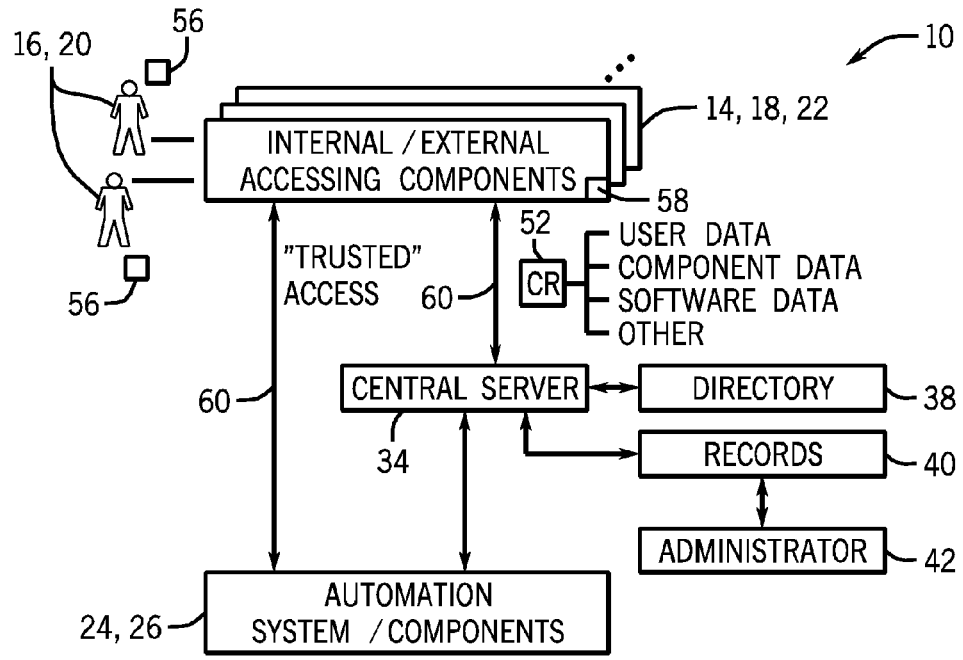
FIG. 2 is a diagrammatical representation of the system of FIG. 1 during a commissioning or maintenance state.

FIG. 2 is a diagrammatical representation of the access control system of FIG. 1 during a commissioning or maintenance operational state, in accordance with an exemplary embodiment. If the accessing component is one with interaction with a human actor 16, 20 then there may be user data 56 associated with the attempted access. This user data may or may not be used as one of the criteria for permitting access. Component data 58 associated with the attempted access is specific to the accessing component 14, 18, 22. In certain embodiments, in the commissioning operational state or the maintenance operational state trusted access 60 is permitted. This trusted access is allowed during periods when the industrial automation system is not in an active operational state and therefore security risks are low. For instance, when industrial automation systems are in a maintenance operational state, all or a substantial number of systems and processes are suspended and vulnerability is low or non-existent. This trusted access 60 may be controlled by the central server 34 or may be direct access from the accessing component to the automation system component 24. In currently contemplated embodiments, for example, all access is permitted during these stages of operation, although all access is nevertheless logged. The commissioning stage of operation may be considered a "learning" stage, in which required information from accessing devices (and some or all human actors) is logged, but access allowed (which may be under the control of one or more administrators).

Figure 3:
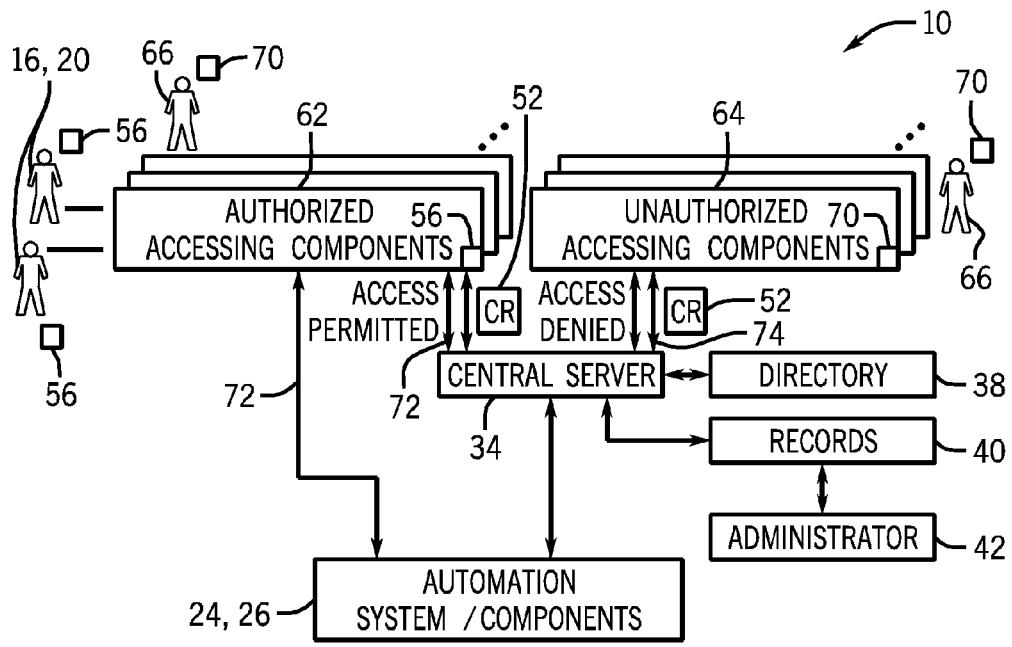
FIG. 3 is a diagrammatical representation of the system of FIG. 1 during an operational state.

FIG. 3 is a similar diagrammatical representation of the access control system during a protected operational state, in accordance with an exemplary embodiment. In this embodiment, during the protected operational state all accessing components 14, 18 are either authorized accessing components 62 or unauthorized accessing components 54 that respectively may be associated with one or more unknown or unauthorized human actors 66. The designation of an accessing component 64 as unauthorized is dependent on the criteria 52 stored in the memory circuitry and processed by the processing circuitry of the access control system 10. The criteria 52 may include user data 68 along with component data 70. Accessing components 14, 18, 22 that are determined by the processing circuitry 44 to be authorized accessing components 62 are permitted access 72. Accessing components 14, 18, 22 that are determined by the processing circuitry 44 to be unauthorized accessing components 64 are denied access 74 to automated system components. In a presently contemplated embodiment, for example, all logged or recorded components and/or human actors permitted during the commissioning of the system will be allowed access during the operational state, at least unless and until they are disallowed, such as by operation of the system administrator. It has been found that this use of learning followed by operation greatly facilitates commissioning by eliminating or reducing the need for administrator-based permissions, while still maintaining a reliable log of all relevant information for later control during the normal operation of the automation system.

Figure 4:
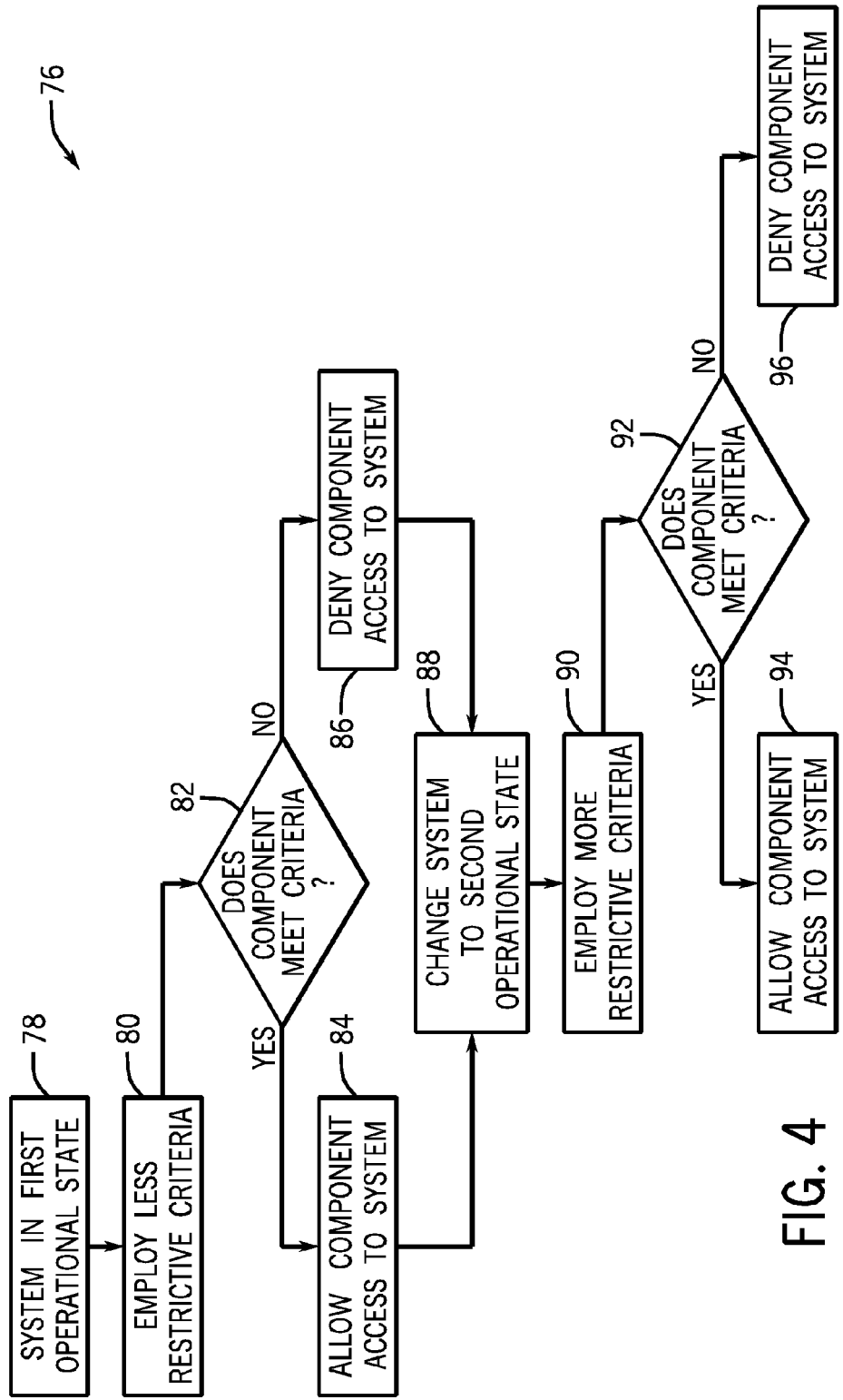
FIG. 4 is a flow chart illustrating exemplary logic for controlling access to an industrial automation system during a first operational state.

FIG. 4 is a flow chart illustrating exemplary logic for controlling access to an industrial automation system in accordance with present techniques. In the presently contemplated embodiment the operational state of an industrial automation system is determined to be in a first operational state 78. This determination can be made either by an administrator 42 or an automated determination made by the processing circuitry 44 of the access control system 10. In this first operational state less restrictive criteria are employed by the system 10 in making the decision 82 of whether the accessing component meets the criteria of interest. If the system determines that the less restrictive criteria are met by the accessing component, then the access control system allows the component access to the automation system, as indicated at step 84. These less restrictive criteria can be essentially no criteria (except the ability to collect the required data for full logging and recording), allowing access to all components attempting access to the automation system no matter the contents of the component data or user data associated with the attempt. After the decision 82 is made that access will be permitted, the access control system 10 may then send a message to the accessing component notifying the component that it has been allowed access.

If the system determines that the criteria are not met by the accessing component, then the access control system denies the accessing component access to the automation system, as indicated at step 86. The access control system 10 may then send a message to the accessing component that it has been denied access. This message may contain detailed information about the criteria not met resulting in the denied access. The message may also contain information regarding the ability of an administrator to change the record 40 of the component attempt to access in order to meet the relevant criteria 52.

At some point, then, the automation system is changed to a second operational state, as indicated by block 88. This change 88 may be made by an administrator 42 or as a result of an automated determination based on parameters about the industrial automation system received and processed by the access control system 10. Such changes may be based, for example, upon scheduled system down time, unscheduled maintenance or servicing, detection of throughput, detection of system dormancy, or any desired basis for representing the different operational state. In many applications, the first operational state may correspond to commissioning and/or system maintenance, as indicated above, while the second state may correspond to production of a product for which the automation system is designed. In the second operational state the access control system employs more restrictive criteria, as indicated by step 90. These more restrictive criteria contain at least one more criterion that must be met by the accessing component in the second state that was not required in the first operational state. These more restrictive criteria are used in the decision 92 to allow the component access to the automation system or to deny the component access to the automation system. If the accessing component meets the more restrictive criteria, access is allowed, as indicated by block 94, otherwise access to the automation system components 24 is denied, as indicated by block 96.

It should be noted that where terms defining the states of operation of the automation system are used in the present disclosure, these should not be understood as limiting. That is, a first state of operation is contemplated that is referred to here as the "commissioning and/or maintenance" state. A second state is referred to as the "operational" state. Depending upon the industry, the particular company or entity, the processes involved, and so forth, these terms may differ in actual practice. However, the terms are intended to indicate that in a first operational state a "lower risk" is perceived of access by accessing components and human actors, as compared to a relatively "higher risk" in the second operational state. Such risks may likewise vary by industry, company or entity, and so forth. Risks may include, for example, product and production risks, financial risks, scheduling risks, and so forth. In chemical and process industries, for example, the first operational state (corresponding to the "commissioning and/or maintenance state" discussed here) may sometimes be termed "shutdown", "startup", "clean" and so forth. In certain other applications there may exist specific periods for maintenance and repair, component servicing, and so forth. In many industries and applications, the second state may correspond to a "run" or "production" state. In still other applications (e.g., material handling), no actual "production" may take place, but automation operations are carried on in accordance with the design of the automation system. Thus, the terms "commissioning and/or maintenance state" and "operational state", or similar terms should be considered in the sense in which they are intended, and not in a narrow sense connoted by their strict meaning.

FIG. 5 is a flow chart illustrating somewhat more detailed logic for controlling access to an industrial automation system in accordance with present techniques. This technique may use what is may be referred to as a "trusted mode" or "learning mode". When an accessing component 14, 18, 22 is seeking access to an automation system component 24 the access control system receives from the component a request to access the system 12, as indicated at step 100. The access control system 10 then compares the component attributes to the attributes of all components that have been previously logged and authorized by the access control system 10. Records 40 as described with reference to FIG. 1 are the result of such component logging. The logging may have occurred as a result of a previous access attempt or by a manual creation of a record by a system administrator 42. Whether a component is authorized or not authorized based on the relevant criteria 52 employed at the time is an element of that record 40. The record is the basis of the decision 104 of whether the current accessing component is logged and authorized. If all the attributes of the accessing component corresponding to the relevant criteria match the criteria listed on an authorized record then it is decided that the component has previously been logged and designated as authorized. The accessing component is therefore allowed access to the system, as indicated by step 106. If the result of the decision 104 is that not all the attributes of the accessing component match those on an authorized record, then the component is not allowed access. At this point, the access control system determines the operational state of the automation system. A decision 110 is made based on whether the operational state is currently in commissioning or maintenance mode (in this exemplary embodiment). If the automation system is operating in commissioning or maintenance mode, then the access control system logs the component attributes and in the resulting record designates the component as authorized. The accessing component is then allowed access to the desired automation system component, as indicated by step 112. If the decision 110 is made that the automation system is not operating in a commissioning or maintenance state, then the access control system logs 114 the attributes of the component, creating a record of the attempt to access by the component and designates the component as not authorized. The component is then denied the requested access to the automation component of the automation system. After an accessing component is either allowed 106 or denied 116 access to the automation system, an administrator is given the opportunity 118 to access the records 40 where the log of component access attempts are stored. The administrator may then change the authorization designation of an accessing component. The administrator may change a record of an accessing component from authorized to not authorized or from not authorized to authorized.

In certain embodiments the administrator 42 of an access control system 10 may configure a set of criteria 52 corresponding to methods to override or circumvent the access control system 10. For example, high priority outgoing messages sent from automation system components 24 such as warnings of a high sensor reading may be allowed to go outbound to all accessing components 14, 18, 22, despite the authorized or not authorized designation of the accessing component. An administrator may also be allowed in some embodiments to permit information incoming to automation components 24. For example, an administrator may configure some specified class of external accessing components 18 to have the ability to transmit information regarding an emergency shutdown to all automation components 24 regardless of the authorization designation of any record 40 associated with that external accessing component 18.

It should be noted that the control of access may allow and deny access to any desired component or information relating to the components. For example, in a presently contemplated embodiment, the access control exercised by the system is actually access to a directory of automation components, of the type discussed above with reference to FIG. 1. As will be appreciated by those skilled in the art, such directories often act as a system key, without which proper addresses and identifying data for the components would be unavailable and extremely unlikely to be determined. Thus, when a denial of access is determined by the system, this may result in the inability of the component attempting access even to navigate to or to determine how to navigate to a particular automation component.

It should also be noted that in certain embodiments, the information what serves as the criteria for access may be more or less restrictive, even during the second operational state of the automation system (e.g., production). For example, in a presently contemplated embodiment, as discussed above, not only is the component logged and this information used as an access criterion, but the particular application or software running on the component (to the extend the particular application may affect the automation system) is used as a criterion, along with the version of the software, a publisher of the application, and so forth. Where all of these desired criteria are not met or do not match recorded data that was the basis for earlier access permission, access may be denied.

Finally, it may be noted that, as mentioned above, a number of advantages flow from the automatic logging of access attempts, whether successful or not, and both during "commissioning and/or maintenance" and "operational" stages of the automation system. For example, such logging allows for simple and accurate record keeping of component and system access, without requiring a separate application process. Because logging is performed during both such stages of the system, ready access may be had during "lower risk" periods or stages, with more stringent access control being applied during "higher risk" periods or stages. The system administrator may still allow access when a desired component or human actor has been refused access, and even when such refusal occurs during the operational stage of the automation system. In such cases, an administrator may simply change (e.g., toggle) a selection on the interface screen of the type described below. Moreover, the system allows for creating audit entry, audit records, and so forth.

FIG. 6 is an exemplary user interface screen of an embodiment of the access control system of FIG. 1, depicting a diagnostic view of an industrial automation system. This view allows an administrator 42 to monitor interactions of interest that are occurring between components 24 of the industrial automation system 12. The listed interactions may include successful and failed access attempts as well as details of any other interactions between components.

FIG. 7 is an exemplary user interface screen of an embodiment of an access control system of FIG. 1, depicting a list of component access log records 40. The records, depending on the operational state and whether the relevant criteria were met or not met by the accessing component 14, 18, 22 at the time of the access attempt, are used in decision made by the access control system. The system determines the designation of a component as an authorized component 62 or unauthorized component 64, based on the criteria and attributes contained in these records, as previously discussed above and illustrated in FIG. 5. In the present embodiment the administrator can review the records 40 and change the authorized designation by simply checking or unchecking a box in the "Access Allowed" column of the user interface. In other embodiments, an administrator may enter a list of criteria that may be met such as a range of component addresses or a range of software versions that should be designated as authorized. In all cases, both the administrator and any other qualified actors (e.g., engineers, system troubleshooters, auditors, etc.) may view and search the records for information relating to accessing components and/or human actors, the data provided or existing at the time of an actual or attempted access, and so forth.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling access to an industrial automation system, comprising:
   determining an operational state of the industrial automation system from a plurality of operational states, wherein the plurality of operational states comprises a commissioning or maintenance state and a production state, wherein the industrial automation system is configured to not produce a product when in the commissioning or maintenance state and to produce the product when in the production state;
   receiving a request to access the industrial automation system from an accessing component configured to interact with the industrial automation system or an industrial automation component of the industrial automation system;
   determining whether the accessing component is authorized to access the industrial automation system based upon the operational state; and
   permitting or denying access to the industrial automation system based upon the authorization determination.

2. The method of claim 1, wherein permitting access to the industrial automation system comprises permitting access to a directory of industrial automation components.

3. The method of claim 1, wherein operation of the industrial automation system is suspended when the industrial automation system is in the commissioning or maintenance state.

4. The method of claim 1, wherein the operational state is automatically set by the industrial automation system.

5. The method of claim 1, wherein criteria used in the commissioning or maintenance state to determine whether the accessing component is authorized are less restrictive than criteria use in the production state to determine whether the accessing component is authorized.

6. The method of claim 1, wherein the accessing component is logged during the commissioning or maintenance state and is thereafter permitted access to the industrial automation system during the production state unless disallowed by an administrator.

7. The method of claim 1, wherein accessing components not logged during the commissioning or maintenance state are thereafter denied access to the industrial automation system during the production state unless permitted by an administrator.

8. The method of claim 1, wherein accessing components denied access can be allowed access by a system administrator.

9. The method of claim 1, wherein criteria used to permit or deny access comprise user identifying data, accessing component identifying data, application data, application version data, application publisher data, or any combination thereof.

10. A method for controlling access to an industrial automation system, comprising:
   permitting access to the industrial automation system based upon first criteria when the industrial automation system is in a commissioning or maintenance state, wherein the industrial automation system is configured to not produce a product when in the commissioning or maintenance state;
   logging accessing components that access the industrial automation system during the commissioning or maintenance state;
   changing the state of the industrial automation system to a production state, wherein the industrial automation system is configured to produce the product when in the production state; and
   permitting access to the industrial automation system based upon second criteria during the production state, wherein the second criteria are more restrictive than the first criteria.

11. The method of claim 10, wherein the first criteria comprise free access to the industrial automation system.

12. The method of claim 10, wherein permitting access to the industrial automation system comprises permitting access to a directory of industrial automation components.

13. A system for controlling access to an industrial automation system, comprising:
   a state determination component configured to determine an operational state of the industrial automation system from a plurality of operating states, wherein the plurality of operational states comprises a commissioning or maintenance state and a production state, wherein the industrial automation system is configured to not produce a product when in the commissioning or maintenance state and to produce the product when in the production state;
   a receiving component configured to receive a request to access the industrial automation system from an accessing component that can interact with the industrial automation system or an industrial automation component of the automation system; and
   an access control component configured to determine whether the accessing component is authorized to access the industrial automation system based upon the operational state and to permit or deny access to the industrial automation system based upon the authorization determination.

14. The system of claim 13, wherein the industrial automation system comprises a directory of industrial automation components, wherein the access control component is configured to permit or deny access to the directory.

15. The system of claim 13, wherein operation of the industrial automation system is suspended when the industrial automation system is in the commissioning or maintenance state.

16. The system of claim 13, wherein the operational state is automatically set by the industrial automation system.

17. The system of claim 13, wherein the access control component is configured to utilize criteria to determine whether the accessing component is authorized, wherein the criteria used in the commissioning or maintenance state are less restrictive than the criteria used in the production state.

18. The system of claim 13, wherein the access control component is configured to log accessing components during the commissioning or maintenance state and to permit access to the logged accessing components during the production state unless disallowed by an administrator.

19. The system of claim 13, wherein the access control component is configured deny access to accessing components not logged during the commissioning or maintenance state during the production state unless permitted by an administrator.

20. The system of claim 13, wherein criteria used to permit or deny access comprise user identifying data, accessing component identifying data, application data, application version data, application publisher data, or any combination thereof.

* * * * *